(12) United States Patent
Letwin

(10) Patent No.: US 10,843,722 B2
(45) Date of Patent: Nov. 24, 2020

(54) SYSTEMS AND METHODS FOR CONTROLLING AN INPUT DEVICE OF AN AUTONOMOUS VEHICLE

(71) Applicant: UATC, LLC, San Francisco, CA (US)

(72) Inventor: Nicholas G. Letwin, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 439 days.

(21) Appl. No.: 15/730,177

(22) Filed: Oct. 11, 2017

(65) Prior Publication Data

US 2018/0362070 A1    Dec. 20, 2018

Related U.S. Application Data

(60) Provisional application No. 62/520,639, filed on Jun. 16, 2017.

(51) Int. Cl.
| | | |
|---|---|---|
| *B62D 1/28* | (2006.01) | |
| *B62D 15/02* | (2006.01) | |
| *G05D 1/02* | (2020.01) | |
| *G05D 1/00* | (2006.01) | |

(52) U.S. Cl.
CPC .............. *B62D 1/28* (2013.01); *B62D 1/286* (2013.01); *B62D 15/021* (2013.01); *B62D 15/025* (2013.01); *G05D 1/0061* (2013.01); *G05D 1/0066* (2013.01); *G05D 1/0088* (2013.01); *G05D 1/0212* (2013.01); *G05D 2201/0213* (2013.01)

(58) Field of Classification Search
CPC ........ B62D 1/28; B62D 1/286; B62D 15/021; B62D 15/025; G05D 1/0066; G05D 1/0061; G05D 1/0212; G05D 1/0088; G05D 2201/0213
See application file for complete search history.

(56) References Cited

U.S. PATENT DOCUMENTS

| | | | |
|---|---|---|---|
| 2015/0088358 A1* | 3/2015 | Yopp .................... | B60W 10/20 701/23 |
| 2016/0052543 A1* | 2/2016 | Weinreich ............ | B62D 5/0481 701/41 |
| 2016/0339880 A1* | 11/2016 | Svensson .............. | B60W 40/08 |
| 2017/0349174 A1* | 12/2017 | Brandin ................ | B60W 10/04 |
| 2018/0088661 A1* | 3/2018 | Betancourt ........ | G01C 21/3667 |
| 2019/0077419 A1* | 3/2019 | Samma ................. | B60W 40/06 |

* cited by examiner

*Primary Examiner* — Mary Cheung
(74) *Attorney, Agent, or Firm* — Dority & Manning, PA

(57) ABSTRACT

Systems and methods for controlling an autonomous vehicle steering mechanism are provided. In one example embodiment, a computer implemented method includes obtaining, by a computing system that includes one or more computing devices, data associated with a steering mechanism of an autonomous vehicle. The method includes identifying, by the computing system, a rate of change associated with the steering mechanism of the autonomous vehicle based at least in part on the data associated with the steering mechanism. The method includes determining, by the computing system, that the rate of change exceeds a rate limit associated with the steering mechanism of the autonomous vehicle. In response to determining that the rate of change exceeds the rate limit, the method includes adjusting, by the computing system, the steering mechanism of the autonomous vehicle.

15 Claims, 6 Drawing Sheets

SYSTEMS AND METHODS FOR CONTROLLING AN INPUT DEVICE OF AN AUTONOMOUS VEHICLE

PRIORITY CLAIM

The present application is based on and claims priority to U.S. Provisional Application 62/520,639 having a filing date of Jun. 16, 2017, which is incorporated by reference herein.

FIELD

The present disclosure relates generally to controlling a steering mechanism of an autonomous vehicle to provide a user control of the steering mechanism.

BACKGROUND

An autonomous vehicle is a vehicle that is capable of sensing its environment and navigating without human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can identify an appropriate motion path through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for controlling an autonomous vehicle steering mechanism. The method includes obtaining, by a computing system including one or more computing devices, data associated with a steering mechanism of an autonomous vehicle. The method includes identifying, by the computing system, a rate of change associated with the steering mechanism of the autonomous vehicle based at least in part on the data associated with the steering mechanism. The method includes determining, by the computing system, that the rate of change exceeds a rate limit associated with the steering mechanism of the autonomous vehicle. In response to determining that the rate of change exceeds the rate limit, the method includes adjusting, by the computing system, the steering mechanism of the autonomous vehicle.

Another example aspect of the present disclosure is directed to a computing system for controlling an autonomous vehicle steering mechanism. The computing system includes one or more processors and one or more memory devices. The one or more memory devices store instructions that when executed by the one or more processors cause the control system to perform operations. The operations include obtaining data associated with a steering mechanism of an autonomous vehicle. The operations include identifying a rate of change associated with the steering mechanism of the autonomous vehicle based at least in part on the data associated with the steering mechanism. The operations include determining that the rate of change exceeds a rate limit associated with the steering mechanism of the autonomous vehicle. In response to determining that the rate of change exceeds the rate limit, the operations include adjusting an amount of a force to be applied to the steering mechanism.

Yet another example aspect of the present disclosure is directed to an autonomous vehicle. The autonomous vehicle includes a steering mechanism for controlling at least a heading of the autonomous vehicle, one or more processors, and one or more memory devices. The one or more memory devices store instructions that when executed by the one or more processors cause the autonomous vehicle to perform operations. The operations include obtaining data associated with the steering mechanism. The operations include determining an occurrence of a fault associated with the autonomous vehicle based at least in part on the data associated with the steering mechanism. The fault is associated with a rate of change associated with the steering mechanism. In response to determining the occurrence of the fault, the operations include adjusting the steering mechanism.

Other example aspects of the present disclosure are directed to systems, methods, vehicles, apparatuses, tangible, non-transitory computer-readable media, and memory devices for controlling an autonomous vehicle steering mechanism.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
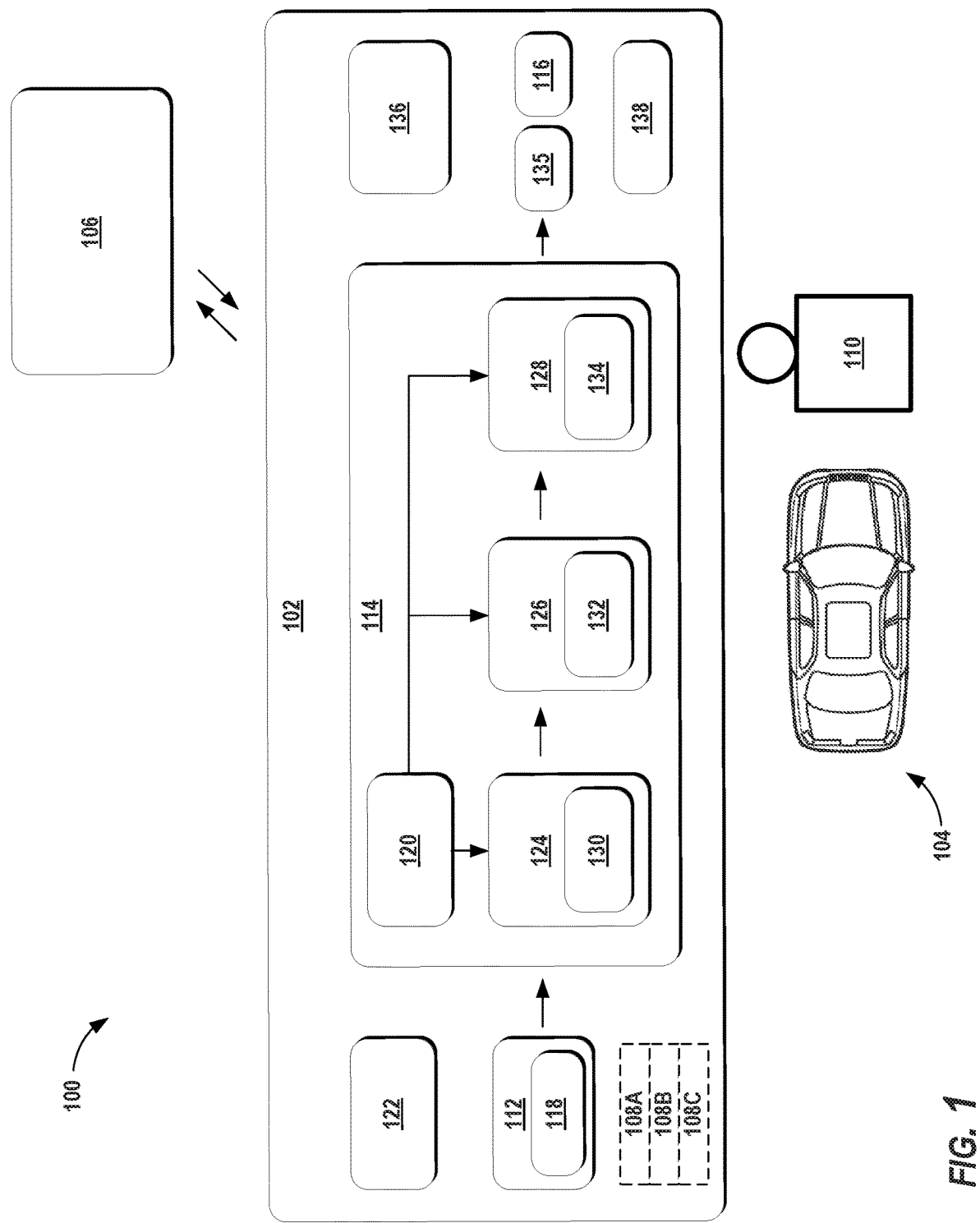
FIG. 1 depicts an example vehicle computing system according to example embodiments of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to controlling the steering mechanism of an autonomous vehicle such that a human operator can effectively intervene to assume control of the vehicle. For instance, an autonomous vehicle can automatically control a heading of the vehicle to adhere to a motion plan for travelling through the vehicle's surrounding environment. To do so, the vehicle's autonomy computing system can determine a position at which a steering mechanism (e.g., steering wheel, joystick) of the vehicle is to be adjusted such that the autonomous vehicle is directed according to the motion plan. A position controller can determine the force required to adjust the steering mechanism to the desired position and can provide a corresponding force request to a motor controller associated with the steering mechanism. The motor controller can receive the force request and adjust the steering mechanism accordingly. For example, in the event that the steering mechanism is a steering wheel, the position controller can determine a torque force needed to rotate the steering wheel to a desired angle and the motor controller can implement the torque force to rotate the steering wheel accordingly.

A human operator can be present in the autonomous vehicle to assist the autonomous vehicle, monitor vehicle operations, and/or take control of the vehicle, if necessary. For example, the human operator can take control of the steering mechanism to assist the autonomous vehicle while moving around an object, performing a complicated maneuver, etc.

According to aspects of the present disclosure, an autonomous vehicle can include a steering control system configured to help ensure that the human operator can effectively take control of the vehicle's steering mechanism. The steering control system can proactively and/or reactively determine a rate of change associated with the position of the steering mechanism. For example, in some implementations, the steering control system can determine a projected rate of change at which the steering mechanism would move if the steering mechanism was adjusted to the desired position with the requested force. In some implementations, the steering control system can determine a current rate of change in the position of the steering mechanism based at least in part on feedback data from a sensor associated with the steering mechanism. The steering control system can include a rate limit (e.g., stored as data in a memory) that represents, for example, a rate at which it may be difficult for the operator to control the steering mechanism given the operator's reaction time. In the event that the determined rate of change exceeds the rate limit, the steering control system can adjust the force to be applied to the steering mechanism. For example, the steering control system can open a switching element in a communication line between the position controller and the motor controller, such that the position controller cannot provide a force request to the motor controller. In this way, the systems and methods of the present disclosure can increase autonomous vehicle safety by ensuring that a human operator can intervene with the steering of an autonomous vehicle, if necessary.

More particularly, an autonomous vehicle can be a ground-based autonomous vehicle (e.g., car, truck, bus, etc.), an air-based autonomous vehicle (e.g., airplane, helicopter, or other aircraft), or other types of vehicles (e.g., watercraft). The autonomous vehicle can be configured to operate in a plurality of operating modes. For example, an autonomous vehicle can be configured to operate in a fully autonomous (e.g., self-driving) operating mode in which the autonomous vehicle can drive and navigate with no interaction from a user present in the vehicle. The autonomous vehicle can be configured to operate in a semi-autonomous operating mode in which the autonomous vehicle can operate with some input from a human operator present in the vehicle. In some implementations, the autonomous vehicle can enter into a manual control operating mode in which the vehicle is controllable (e.g., fully) by an operator and can be prohibited from performing autonomous navigation (e.g., autonomous driving).

An autonomous vehicle can include a vehicle computing system that implements a variety of systems located onboard the autonomous vehicle. For instance, the autonomous vehicle can include one or more sensors (e.g., light detection and ranging (LIDAR) sensors, radio detection and ranging (RADAR) sensors, cameras, ultrasonic sensors etc.), an autonomy system, one or more vehicle control systems, etc. The sensor(s) can gather sensor data (e.g., image data, RADAR data, LIDAR data) associated with one or more object(s) that are proximate to the autonomous vehicle (e.g., within a field of view of the sensor(s)). The object(s) can include, for example, other vehicles, bicycles, pedestrians, etc. The sensor data can be indicative of characteristics (e.g., locations) associated with the object(s) at one or more times. The sensor(s) can provide such sensor data to the vehicle's autonomy system.

The autonomy system can be configured to perceive the surrounding environment of the autonomous vehicle (based at least in part on the sensor data) and determine a motion plan for controlling the motion of the autonomous vehicle. The autonomy system can provide the motion plan indicative of the vehicle actions, a planned trajectory, and/or other operating parameters to the vehicle control system(s) to implement the motion plan for the vehicle. For instance, the autonomous vehicle can include a mobility controller configured to translate the motion plan into instructions. By way of example, the mobility controller can translate a determined motion plan into instructions to adjust the steering mechanism of the vehicle to a certain position (e.g., "X" degrees), at a certain rate, within a certain time, etc. The mobility controller can send one or more control signals to the vehicle control system(s) to execute the instructions and implement the motion plan.

The vehicle control system(s) can be configured to control the motion of the autonomous vehicle. For instance, an autonomous vehicle can include an acceleration control system that is configured to control the acceleration of the autonomous vehicle, a braking control system that is configured to control the braking of the autonomous vehicle, a steering control system that is configured to control the steering of the autonomous vehicle, and/or other control systems. The steering control system, for example, can be a computing system that includes one or more computing devices, any of which (and/or combination of which) can implement and/or perform the operations, processes, methods, etc. of the steering control system and its components. The computing device(s) can be positioned at various locations onboard an autonomous vehicle. The steering control system can include various components that communicate to control a steering mechanism (e.g., steering wheel, control stick, yoke, etc.) of an autonomous vehicle. For example, the steering control system can include a position controller, a motor controller, a rate control system, and/or other components.

The position controller can receive the instructions from the mobility controller requesting that the steering mechanism be adjusted to a desired position. For example, the position controller can obtain data indicative of a position to which the steering mechanism is to be adjusted (e.g., an angle to which it is to be rotated), a rate of speed (e.g., angular rate) at which the steering mechanism is to be adjusted, the timing at which the steering mechanism is to be adjusted, etc. The position controller can determine the force (e.g., torque force) required to adjust the steering mechanism to the desired position. For example, the position controller can determine the amount of torque force that would be required to move a steering wheel to a desired position within a certain time frame to operate the vehicle in accordance with the motion plan. The position controller can provide (e.g., via a communication line) one or more control signals indicative of a corresponding force request (e.g., torque request) to the motor controller associated with the steering mechanism. The force request can be indicative of at least a portion of the amount of force (e.g., overlay torque force) to be applied to the steering mechanism to cause a movement of the steering mechanism.

The motor controller can receive the force request and adjust the steering mechanism accordingly. For example, the motor controller can receive the control signal(s) from the position controller indicating the amount of torque to be applied to the steering mechanism. In some implementations, the motor controller can receive a force request from another system onboard the vehicle. For example, the autonomous vehicle can include a power assist system that can provide one or more control signals (e.g., to the motor controller) that are indicative of an additional amount of force to be applied to the steering mechanism (e.g., a power steering assist torque force). In such a case, the motor controller can sum the forces requested from the position controller and the power assist system to determine the total amount of force to be applied to the steering mechanism. The motor controller can cause a motor associated with the steering mechanism to move in accordance with the requested amount of torque force. Accordingly, the heading of the autonomous vehicle can be adjusted to the desired angle of the motion plan.

The steering control system can be also configured to control the rate of the steering mechanism such that a human operator within the autonomous vehicle can effectively assume control of the vehicle's motion, if necessary. For example, a micro-controller implementing the position controller may fail, causing the position controller to determine that the steering mechanism should be moved to a particular position (e.g., angle) at a high rate (e.g., angular rate). The position controller can determine a force that should be applied to the steering mechanism to adjust it to that position at such a high rate. However, such a high rate may make it difficult for a human operator to assume control of the autonomous vehicle.

The rate control system can be configured to detect such a fault and respond accordingly. For instance, the rate control system can receive data associated with the steering mechanism of the autonomous vehicle. The data associated with the steering mechanism can be indicative of the requested position to which the steering mechanism is to be adjusted, a rate of change associated with the steering mechanism (e.g., angular rate of change), and/or at least a portion of the amount of the force to be applied to the steering mechanism (e.g., the overlay torque determined by the position controller). Such data can be obtained from the mobility controller, the position controller, the motor controller, a sensor associated with the steering mechanism, and/or another component of the autonomous vehicle.

The rate control system can determine the occurrence of a fault associated with the autonomous vehicle based at least in part on the data associated with the steering mechanism. For example, the rate control system can identify a rate of change (e.g., an angular rate of change) associated with the steering mechanism of the autonomous vehicle based at least in part on the data associated with the steering mechanism. As described herein, the rate control system can proactively and/or reactively determine a rate of change associated with the position of the steering mechanism. In some implementations, the steering control system can determine a projected rate of change at which the steering mechanism would move if the steering mechanism was adjusted to the desired position with the requested force (e.g., based at least in part on data from the mobility controller and/or the position controller). In some implementations, the steering control system can determine a current rate of change in the position of the steering mechanism (e.g., based at least in part on feedback data from a sensor associated with the steering mechanism).

The rate control system can compare the rate of change associated with the steering mechanism to a rate limit to determine whether a fault has occurred. The rate limit can be based at least in part on a rate limit curve defined using measurements of human operator reaction times and analysis of vehicle movement in a fault condition. For instance, the rate limit can represent a rate at which it would be difficult for the human operator to react in time to assume the necessary control of the steering mechanism. In some implementations, the rate limit can be based at least in part on a current and/or planned vehicle speed and/or other factors. The rate limit can be stored as data in a memory that is accessible by the rate control system (e.g., the processors associated therewith). In some implementations, the rate limit can be adjusted, as described herein. The rate control system can determine whether the identified rate of change (e.g., angular rate of change) associated with the steering mechanism exceeds the rate limit (e.g., an angular rate limit) associated with the steering mechanism (e.g., steering wheel). If so, the rate control system can determine that a fault associated with the autonomous vehicle (e.g., the steering control system, the position controller, etc.) has occurred.

The steering control system can adjust the steering mechanism of the autonomous vehicle based at least in part on the occurrence of the fault. For instance, the rate control system can adjust the amount of the force (e.g., torque force) to be applied to the steering mechanism based at least in part on the rate exceeding the rate limit. To do so, the rate control system can provide one or more control signals to prevent and/or override communication from the position controller to the motor controller. For example, the rate control system can provide one or more control signals to open a switching element positioned between the position controller and the motor controller. This can prevent the motor controller from receiving a control signal indicative of a force (e.g., torque force) requested by the position controller. As such, the motor controller is prevented/stopped from applying the amount of force erroneously determined by the position controller, which would cause the position of the steering mechanism to move at a rate of change that exceeds the rate limit. In this way, the steering control system can help ensure that a human operator can effectively assume control of the vehicle. In some implementations, the operator can control only the steering mechanism of the autonomous vehicle and/or other aspects of the vehicle, while some aspects (e.g., vehicle speed) are controlled by the vehicle computing system. In some implementations, the operator can fully control the motion of the autonomous vehicle (with or without operating assistance systems) and/or other aspects of the vehicle.

In some implementations, the autonomous vehicle can change the operating mode of the autonomous vehicle based at least in part on the occurrence of the fault. For example, the autonomous vehicle can be operating in the autonomous operating mode when the rate control system determines that the rate of change associated with the steering mechanism exceeds the rate limit. In response to the detection of the fault, the autonomous vehicle can be adjusted to the manual operating mode to provide the human operator with full control of the autonomous vehicle. In some implementations, the autonomous vehicle can include an indicator (e.g., visual, audible, haptic) within an interior cabin of the autonomous vehicle. The autonomous vehicle can activate the indicator to alert the human operator to provide user input to the steering mechanism (e.g., to manually operate the steering wheel). In the event that the operator is unable to assume control of the steering mechanism the autonomous vehicle can decelerate to safe, stopped position. Once the fault has been resolved, the autonomous vehicle can return to full autonomous operation, as further described herein.

The system and methods described herein may provide a number of technical effects and benefits. For instance, the systems and methods described herein enable the vehicle's steering control system to locally (e.g., onboard the vehicle) detect whether the steering mechanism may exceed a rate (e.g., angular rate) that would make it difficult for a human operator to assume control of vehicle steering. In response, the autonomous vehicle can appropriately adjust the steering mechanism by removing at least a portion of the force applied thereto using a simple computational architecture beyond the initial safety constraints programmed within a position controller. This provides a simpler approach than imposing a maximum rate limit, which would require more complicated modulation of the position controller's force request (e.g., a torque force request). Thus, the systems and methods of the present disclosure allow the autonomous vehicle to react quickly to prevent and/or reduce movement of the steering mechanism without adding additional complex hardware to the vehicle's steering control system. This can allow an autonomous vehicle to be more easily updated and/or retrofitted with the technology of the present disclosure. Additionally, such an approach can increase vehicle and operator safety by including an additional safety measure with respect to the steering mechanism.

The systems and methods of the present disclosure also provide an improvement to vehicle computing technology, such as autonomous vehicle computing technology. For example, under the present disclosure a computing system located onboard the autonomous vehicle can obtain data associated with a steering mechanism of the autonomous vehicle. The computing system can identify a rate of change (e.g., an angular rate) associated with a position of the steering mechanism based at least in part on the data associated with the steering mechanism. The computing system can determine whether the rate of change (e.g., angular rate) exceeds a rate limit (e.g., angular rate limit) associated with the steering mechanism of the autonomous vehicle. The computing system can adjust the steering mechanism of the autonomous vehicle based at least in part on the rate of change exceeding the rate limit. This can allow the computing system to regulate the motion of the vehicle's steering mechanism based at least in part on a steering position and/or a rate. This provides an improvement to autonomous vehicle operations because the vehicle's motion planning system is more likely to describe vehicle motion in terms of a steering position and/or a steering position rate. More particularly, the motion planning system of an autonomous vehicle should have knowledge of the steering system's capabilities in a domain that allows for easy reasoning by the motion planning system. Because the motion planning system deals with the actual motion of the autonomous vehicle, steering position and rate are two useful parameters with which to constrain vehicle motion. Thus, the system and methods described herein provide a more effective approach to implement additional safety measures on the steering mechanism of an autonomous vehicle.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 104 and an operations computing system 106 that is remote from the vehicle 104. The operations computing system 106 can include one or more computing devices that are remote from the vehicle 104 (e.g., located off-board the vehicle 104). For example, such computing device(s) can be components of a cloud-based server system and/or other type of computing system that can communicate with the vehicle computing system 102 of the vehicle 104. The computing device(s) of the operations computing system 106 can include various components for performing various operations and functions. For instance, the computing device (s) can include one or more processor(s) and one or more tangible, non-transitory, computer readable media. The one or more tangible, non-transitory, computer readable media can store instructions that when executed by the one or more processor(s) cause the operations computing system 106 (e.g., the one or more processors, etc.) to perform operations and functions.

The vehicle 104 incorporating the vehicle computing system 102 can be a ground-based autonomous vehicle (e.g., car, truck, bus, etc.), an air-based autonomous vehicle (e.g., airplane, helicopter, or other aircraft), or other types of vehicles (e.g., watercraft, etc.). The vehicle 104 can be an autonomous vehicle that can drive, navigate, operate, etc. with minimal and/or no interaction from a human driver. For instance, the vehicle 104 can be configured to operate in a plurality of operating modes 108A-C. The vehicle 104 can be configured to operate in a fully autonomous (e.g., self-driving) operating mode 108A in which the vehicle 104 can drive and navigate with no input from a user present in the vehicle 104. The vehicle 104 can be configured to operate in a semi-autonomous operating mode 108B in which the vehicle 104 can operate with some input from a user present in the vehicle 104. The vehicle 104 can enter into a manual operating mode 108C in which the vehicle 104 is fully controllable by a user (e.g., human driver) and can be prohibited from performing autonomous navigation (e.g., autonomous driving). In some implementations, the vehicle 104 can implement vehicle operating assistance technology (e.g., collision mitigation system, power assist steering, etc.) while in the manual operating mode 108C to help assist the operator of the vehicle 104.

A user 110 (e.g., a human operator) can be present in the vehicle 104. The user 110 can assist the vehicle 104, monitor vehicle operations, and/or take control of the vehicle 104, if necessary. For example, the user 110 can take control of the steering mechanism to assist the vehicle 104 while moving around an object, performing a complicated maneuver, etc.

The operating mode of the vehicle 104 can be adjusted in a variety of manners. In some implementations, the operating mode of the vehicle 104 can be selected remotely, off-board the vehicle 104. For example, an entity associated with the vehicle 104 (e.g., a service provider) can utilize the operations computing system 106 to manage the vehicle 104 (and/or an associated fleet). The operations computing system 106 can send one or more control signals to the vehicle 104 instructing the vehicle 104 to enter into, exit from, maintain, etc. an operating mode. By way of example, the operations computing system 106 can send one or more control signals to the vehicle 104 instructing the vehicle 104 to enter into the fully autonomous operating mode 108A. In some implementations, the operating mode of the vehicle 104 can be set onboard and/or near the vehicle 104. For example, the operating mode of the vehicle 104 can be selected via one or more interfaces located onboard the vehicle 104 (e.g., key switch, button, etc.) and/or associated with a computing device proximate to the vehicle 104 (e.g., a tablet operated by authorized personnel located near the vehicle 104). As described herein, the vehicle computing system 102 can automatically adjust the operating mode of the vehicle 104 (e.g., without user input).

In some implementations, the vehicle 104 can be associated with an entity (e.g., a service provider, owner, manager). The entity can be one that provides one or more vehicle service(s) to a plurality of users via a fleet of vehicles that includes, for example, the vehicle 104. In some implementations, the entity can be associated with only vehicle 104 (e.g., a sole owner, manager). In some implementations, the operations computing system 106 can be associated with the entity.

The vehicle 104 can be configured to provide one or more vehicle services to one or more users. The vehicle service(s) can include transportation services (e.g., rideshare services in which user rides in the vehicle 104 to be transported), courier services, delivery services, and/or other types of services. A user 110 can request such services via communication with the entity (e.g., via a software application of a user device).

The vehicle computing system 102 can include one or more computing devices located onboard the vehicle 104. The computing devices can implement one or more of the systems onboard the vehicle 104 described herein. For example, the computing device(s) can be located on and/or within the vehicle 104. The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 104 (e.g., its computing system, one or more processors, etc.) to perform operations and functions. For example, the vehicle computing system 102 can perform operations and functions for controlling an autonomous vehicle steering mechanism, as described herein.

As shown in FIG. 1, the vehicle 104 can include one or more sensors 112, an autonomy computing system 114, and one or more vehicle control systems 116. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The sensor(s) 112 can be configured to acquire sensor data 118 associated with one or more objects that are proximate to the vehicle 104 (e.g., within a field of view of one or more of the sensor(s) 112). The sensor(s) 112 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 118 can include image data, radar data, LIDAR data, and/or other data acquired by the sensor(s) 112. The object(s) can include, for example, pedestrians, vehicles, bicycles, and/or other objects. The object(s) can be located in front of, to the rear of, and/or to the side of the vehicle 104. The sensor data 118 can be indicative of locations associated with the object(s) within the surrounding environment of the vehicle 104 at one or more times. The sensor(s) 112 can provide the sensor data 118 to the autonomy computing system 114.

In addition to the sensor data 118, the autonomy computing system 114 can retrieve or otherwise obtain map data 120. The map data 120 can provide detailed information about the surrounding environment of the vehicle 104. For example, the map data 120 can provide information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle 104 in comprehending and perceiving its surrounding environment and its relationship thereto.

The vehicle 104 can include a positioning system 122. The positioning system 122 can determine a current position of the vehicle 104. The positioning system 122 can be any device or circuitry for analyzing the position of the vehicle 104. For example, the positioning system 122 can determine position by using one or more of inertial sensors (e.g., inertial measurement units), a satellite positioning system, based on IP address, by using triangulation and/or proximity to network access points or other network components (e.g., cellular towers, WiFi access points, etc.) and/or other suitable techniques. The position of the vehicle 104 can be used by various systems of the vehicle computing system 102 and/or provided to a remote computing device (e.g., of the operations computing system 106). For example, the map data 120 can provide the vehicle 104 relative positions of the surrounding environment of the vehicle 104. The vehicle 104 can identify its position within the surrounding environment (e.g., across six axes) based at least in part on the data described herein. For example, the vehicle 104 can process the sensor data 118 (e.g., LIDAR data, camera data) to match it to a map of the surrounding environment to get an understanding of the vehicle's position within that environment.

The autonomy computing system 114 can include a perception system 124, a prediction system 126, a motion planning system 128, and/or other systems that cooperate to perceive the surrounding environment of the vehicle 104 and determine a motion plan for controlling the motion of the vehicle 104 accordingly. For example, the autonomy computing system 114 can receive the sensor data 118 from the sensor(s) 112, attempt to comprehend the surrounding environment by performing various processing techniques on the sensor data 118 (and/or other data), and generate an appropriate motion plan through such surrounding environment. The autonomy computing system 114 can control the one or more vehicle control systems 116 to operate the vehicle 104 according to the motion plan.

The autonomy computing system 114 can identify one or more objects that are proximate to the vehicle 104 based at least in part on the sensor data 118 and/or the map data 120. For example, the perception system 124 can obtain state data 130 descriptive of a current state of an object that is proximate to the vehicle 104. The state data 130 for each object can describe, for example, an estimate of the object's: current location (also referred to as position); current speed (also referred to as velocity); current acceleration; current heading; current orientation; size/footprint (e.g., as represented by a bounding shape); class (e.g., pedestrian class vs. vehicle class vs. bicycle class), and/or other state information. In some implementations, the state data 130 can indicate an uncertainty associated with any of this information. The perception system 124 can provide the state data 130 to the prediction system 126 (e.g., for predicting the movement of an object). In some implementations, the perception system 124 can determine state data 130 for each object over a number of iterations. In particular, the perception system 124 can update the state data 130 for each object at each iteration. Thus, the perception system 124 can detect and track objects (e.g., vehicles, pedestrians, bicycles, and the like) that are proximate to the vehicle 104 over time.

The prediction system 126 can create predicted data 132 associated with each of the respective one or more objects proximate to the vehicle 104. The predicted data 132 can be indicative of one or more predicted future locations of each respective object. The predicted data 132 can be indicative of a predicted path (e.g., predicted trajectory) of at least one object within the surrounding environment of the vehicle 104. For example, the predicted path (e.g., trajectory) can indicate a path along which the respective object is predicted to travel over time (and/or the speed at which the object is predicted to travel along the predicted path). The prediction system 126 can provide the predicted data 132 associated with the object(s) to the motion planning system 128.

The motion planning system 128 can determine a motion plan 134 for the vehicle 104 based at least in part on the predicted data 132 (and/or other data). The motion plan 134 can include vehicle actions with respect to the objects proximate to the vehicle 104 as well as the predicted movements, and the aspects of the travel way. For instance, the motion planning system 128 can implement an optimization algorithm that considers cost data associated with a vehicle action as well as other objective functions (e.g., cost functions based on speed limits, traffic lights, etc.), if any, to determine optimized variables that make up the motion plan 134. By way of example, the motion planning system 128 can determine that the vehicle 104 can perform a certain action (e.g., pass an object) without increasing the potential risk to the vehicle 104 and/or violating any traffic laws (e.g., speed limits, lane boundaries, signage). The motion plan 134 can include a planned trajectory, speed, acceleration, etc. of the vehicle 104. The motion plan 134 can be associated with a particular vehicle route along which, and/or destination to which, the vehicle 104 is to travel.

The motion planning system 128 can provide the motion plan 134 with data indicative of the vehicle actions, a planned trajectory, and/or other operating parameters to the vehicle control system(s) 116 to implement the motion plan 134 for the vehicle 104. For instance, the vehicle 104 can include a mobility controller 135 configured to translate the motion plan 134 into instructions. By way of example, the mobility controller 135 can translate a determined motion plan 134 into instructions to adjust the steering of the vehicle 104 to a particular position (e.g., "X" degrees, lateral direction, etc.), apply a certain magnitude of braking force, etc. The mobility controller 135 can send one or more control signals to the responsible vehicle control component (e.g., braking control system, steering control system, acceleration control system) to execute the instructions and implement the motion plan 134, as further described herein. In some implementations, the mobility controller 135 can be implemented as an aspect of another system (e.g., autonomy system 114, control system 116) and/or separate therefrom.

The vehicle 104 can include a communications system 136 configured to allow the vehicle computing system 102 (and its computing device(s)) to communicate with other computing devices. The vehicle computing system 102 can use the communications system 136 to communicate with the operations computing system 106 and/or one or more other remote computing device(s) over one or more networks (e.g., via one or more wireless signal connections). In some implementations, the communications system 136 can allow communication among one or more of the system(s) on-board the vehicle 104. The communications system 136 can include any suitable components for interfacing with one or more network(s), including, for example, transmitters, receivers, ports, controllers, antennas, and/or other suitable components that can help facilitate communication.

The vehicle 104 can include one or more human-machine interfaces 138. For example, the vehicle 104 can include one or more display devices located onboard the vehicle 104. A display device (e.g., screen of a tablet, laptop, other user device, etc.) can be viewable by a user of the vehicle 104 that is located in the front of the vehicle 104 (e.g., driver's seat, front passenger seat). Additionally, or alternatively, a display device can be viewable by a user of the vehicle 104 that is located in the rear of the vehicle 104 (e.g., back passenger seat(s)). The human machine interface(s) 138 can receive information from a user via user input and/or provide information for display.

Figure 2:
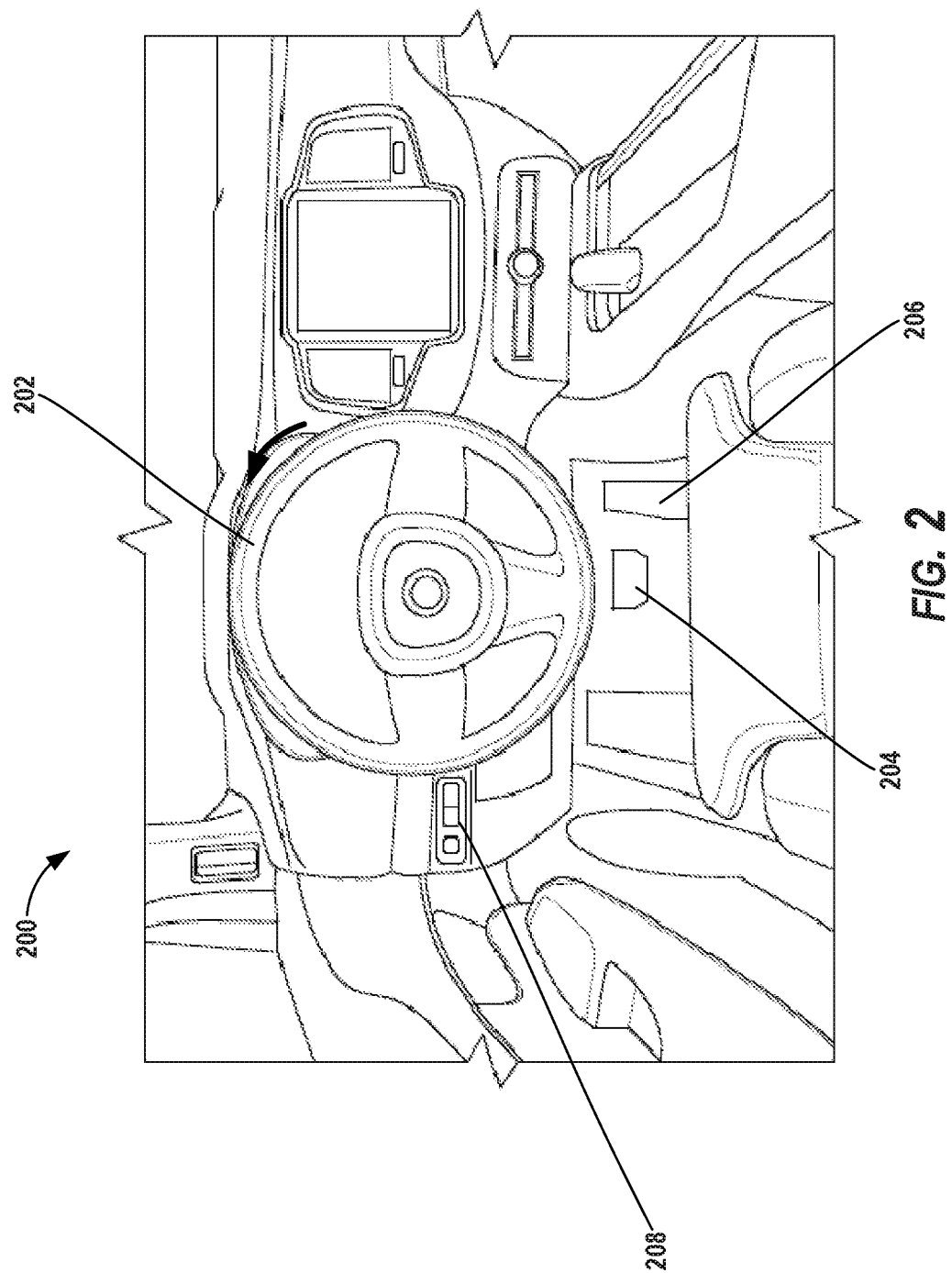
FIG. 2 depicts an example interior vehicle cabin according to example embodiments of the present disclosure.

The vehicle 104 can include one or more vehicle input devices that are located onboard the vehicle 104 (e.g., on and/or within the vehicle 104). For example, FIG. 2 depicts an example portion of a vehicle interior 200 of the vehicle 104 showing vehicle input device(s) according to example embodiments of the present disclosure. FIG. 2 shows the vehicle interior associated with an automobile for example discussion purposes only and is not meant to be limiting. As described, the vehicle 104 can be other types of vehicles and the vehicle input devices can be other forms of devices that are implemented on (and/or could be implemented on) such other types of vehicles.

The vehicle 104 can include one or more vehicle input devices that are configured to affect the motion of the vehicle 104. Such vehicle input device(s) can include a steering mechanism 202 of the vehicle 104, a braking mechanism 204 of the vehicle 104, an acceleration mechanism 206 of the vehicle 104, and/or other devices. The steering mechanism 202 can include a device that can be adjusted to control the heading of the vehicle 104. For example, the steering mechanism 202 can include a steering wheel, control stick, etc. The braking mechanism 204 can include a device that can be adjusted to control the braking of the vehicle 104. For example, the braking mechanism 204 can include a brake pedal, parking brake, electronic braking system, etc. The acceleration mechanism 206 can include a device that can be adjusted to control the acceleration of the vehicle 104. For example, the acceleration mechanism 206 can include a gas pedal, hand throttle, etc. In some implementations, the vehicle input device(s) can also include a power state adjustment mechanism of the vehicle 104 (e.g., push button, key switch ignition, etc.). The vehicle input device(s) can also include a gear shift and/or a PRND control device (e.g., park-reverse-neutral-drive control).

The vehicle 104 can also include an indicator 208 located in the vehicle interior 200 of the vehicle 104. The indicator 208 can include a device configured to provide a visual indication to a user 110. For example, the indicator 208 can include a lighting mechanism (e.g., LED), display device (e.g., screen), etc. In some implementations, the indicator 208 can include a device configured to provide an audible indication to a user 110. For example, the indicator 208 can include one or more speakers and/or other devices for producing audible sound. The vehicle computing system 102 can activate an indicator 208 to alert a user 110 (e.g., human operator) located within the vehicle 104 to provide input to a vehicle input device such as, for example, a steering mechanism 202 of the vehicle 104, as further described herein.

The vehicle input device(s) can also include one or more vehicle input device(s) that are configured to control an indication of vehicle motion. For example, the vehicle input device(s) can include a turn indication mechanism of the vehicle 104, a hazard indication mechanism of the vehicle 104, and/or other devices. The turn indication mechanism can include a device that can be adjusted to activate an indication (e.g., a turn signal) that the vehicle 104 may turn. For example, the turn indication mechanism can include a turn signal control, etc. The hazard indication mechanism can include a device that can be adjusted to control a hazard indication provided by the vehicle 104 (e.g., hazard lights). For example, the hazard indication mechanism can include a hazard light activation button, etc. Some vehicle input devices can be configured to control both the motion of the vehicle 104 and an indication of vehicle motion. For example, a braking mechanism 204 can be used to cause a deceleration (and/or stop) of the vehicle 104 as well as to activate the braking lights of the vehicle 104 (e.g., to indicate the vehicle 104 is decelerating, stopped, parked, etc.).

In some implementations, the vehicle input device(s) can be associated with other features of the vehicle 104. For instance, the vehicle input device(s) can be associated with control of the windshield wipers, headlights, fog lights, horn, vehicle sound system, windows, cabin lighting (e.g., overhead light, instrument panel brightness, etc.), temperature, fan speed, airflow, seat position and/or conditioning, defrost, hood release, truck release, etc.

In some implementations, the vehicle input device(s) can be associated with other features of the vehicle 104. For instance, the vehicle input device(s) can be associated with control of the windshield wipers, headlights, fog lights, horn, vehicle sound system, windows, cabin lighting (e.g., overhead light, instrument panel brightness, etc.), temperature, fan speed, airflow, seat position and/or conditioning, defrost, hood release, truck release, etc. A user can provide input (e.g., physical manipulation, voice activation, etc.) with respect to such vehicle input devices to control the various aspects of the vehicle 104 associated with the respective vehicle input device.

The vehicle input device(s) can be configured to adjust the operation of the vehicle 104. The vehicle input devices can adjust the operation of the vehicle 104 based at least in part on an input by a user 110 with respect to the vehicle input device(s) such as by physical manipulation, by voice activation, etc. of the vehicle input device(s). When the vehicle input device(s) are enabled (e.g., in the manual operating mode 108C), a user 110 can provide input with respect to the vehicle input device(s) to affect the operation of the vehicle 104 such as to control motion, motion indication, and/or other features associated with the vehicle 104. Additionally, or alternatively, the input device(s) can be configured to be adjusted by the vehicle 104 without input from a user 110. For instance, a vehicle input device can be adjusted automatically by a control system of the vehicle computing 102 that is associated with that particular vehicle input device.

Figure 3:
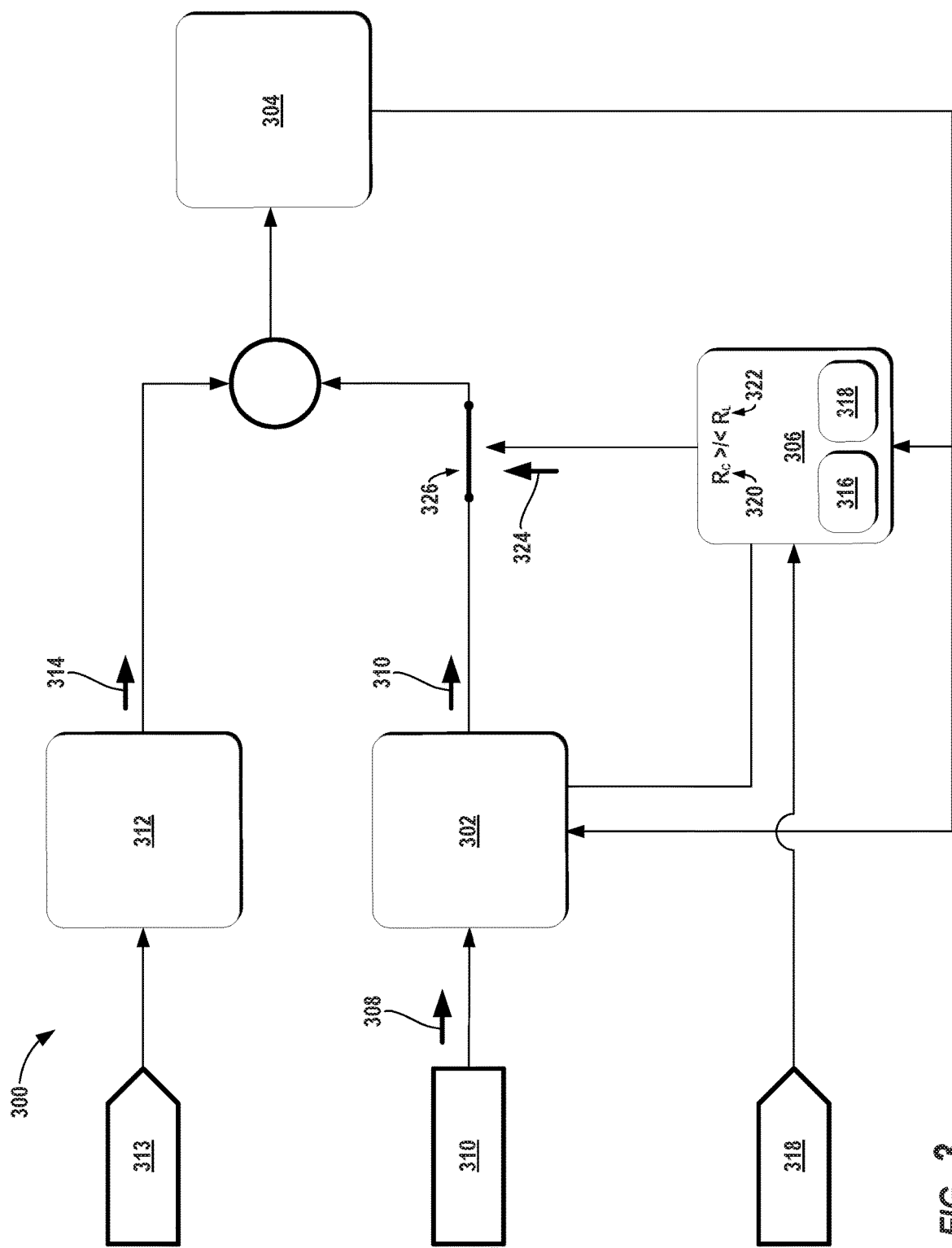
FIG. 3 depicts an example steering control system for controlling a steering mechanism of an autonomous vehicle according to example embodiments of the present disclosure.

FIG. 3 depicts an example steering control system 300 for controlling a steering mechanism 202 of a vehicle 104 according to example embodiments of the present disclosure. The steering control system 300 can be implemented as a portion of the vehicle computing system 102 and can be implemented on the same and/or separate computing devices as other systems of the vehicle computing system 102. The steering control system 300 can itself be a computing system that includes one or more computing devices, any of which (and/or combination of which) can implement and/or perform the operations, processes, methods, etc. of the steering control system and its components. The computing device(s) of the steering control system 300 can be positioned at various locations onboard a vehicle 104. The steering control system 300 can include various components that communicate to control a steering mechanism 202 (e.g., steering wheel, control stick, yoke, etc.) of the vehicle 200. For example, the steering control system 300 can include a position controller 302, a motor controller 304, a rate control system 306, and/or other components. Similar such control systems can be configured to control other vehicle input device(s).

The position controller 302 associated with the steering mechanism 202 can be configured to receive the instructions (e.g., from the mobility controller 135) requesting that the steering mechanism 202 be adjusted to a desired position. For example, the position controller 302 can receive one or more control signals 308 from the mobility controller 135. In this way, the position controller 302 can obtain data 310 indicative of a position to which the steering mechanism 202 is to be adjusted (e.g., an angle to which it is to be rotated), a rate of speed (e.g., angular velocity rate) at which the steering mechanism 202 is to be adjusted, the timing at which the steering mechanism 202 is to be adjusted (e.g., within X timeframe, at a point in time, etc.), and/or other information. The position controller 302 can determine the force (e.g., torque force) required to adjust the steering mechanism 202 to the desired position. For example, the position controller 302 can determine the amount of torque force that would be required to move a steering wheel to a desired position within a certain time frame to operate the vehicle 104 in accordance with the motion plan 134. The position controller 302 can provide (e.g., via a communication line) one or more control signals 310 indicative of a corresponding force request (e.g., torque request) to the motor controller 304 associated with the steering mechanism 202. The control signal(s) 310 can be indicative of at least a portion of the amount of force (e.g., overlay torque force) to be applied to the steering mechanism 202 (e.g., to cause a movement of the steering mechanism 202).

The motor controller 304 can be configured to receive the control signals 310 and adjust the steering mechanism 202 accordingly. For example, the motor controller 304 can receive the control signal(s) 310 from the position controller 302 indicating the amount of force (e.g., torque force) to be applied to the steering mechanism 202. The motor controller 304 can cause a motor, actuator, servo, hydraulic, pneumatic, and/or other such mechanical means associated with the steering mechanism 202 to move based at least in part on the control signal(s) 310 (e.g., the requested amount of force). Accordingly, the steering mechanism 202 can be moved and the heading of the vehicle 104 can be adjusted to the desired position (e.g., angle) of the motion plan 134.

In some implementations, the motor controller 304 can receive one or more control signals (e.g., indicating a force request) from another system onboard the vehicle 104. For example, the vehicle 104 can include a power assist system 312 that can provide one or more control signals 314 (e.g., to the motor controller 304) that are indicative of an additional amount of force to be applied to the steering mechanism 202 (e.g., a power steering assist torque force). The power assist system 312 can, for example, be configured to receive data from one or more sensors 313 associated with a power assist steering system. In such a case, the motor controller 304 can sum the forces requested from the position controller 302 and the power assist system 312 to determine the total amount of force to be applied to the steering mechanism 202. The motor controller 304 can cause the motor associated with the steering mechanism 202 to move in accordance with the total amount of force.

The steering control system 300 can be also configured to control the rate of the steering mechanism 202 such that a user 110 (e.g., human operator) within the vehicle 104 can effectively assume at least partial control of the vehicle's motion, if necessary. For example, a micro-controller implementing the position controller 302 may fail, causing the position controller 302 to determine that the steering mechanism 202 should be moved to a particular position (e.g., angle) at a high rate (e.g., angular rate). In such an example, the position controller 302 may erroneously determine a force that should be applied to the steering mechanism 202 to adjust it to that position at such a high rate. However, such a high rate may make it difficult for a user 110 to assume control of the vehicle 104.

The rate control system 306 can be configured to detect such a fault and respond accordingly. For instance, the rate control system 306 can obtain data 316 associated with the steering mechanism 202 of the vehicle 104. The data 316 associated with the steering mechanism 202 can be indicative of at least one of a position to which the steering mechanism 202 is to be adjusted (e.g., a requested position), a rate of change associated with the steering mechanism 202 (e.g., angular rate of change), or at least a portion of the amount of the force to be applied to the steering mechanism 202 (e.g., the overlay torque determined by the position controller 302).

In some implementations, the data 316 associated with the steering mechanism 202 can be obtained via one or more sensors 318. The sensor(s) 318 can be associated with the steering mechanism 202. The sensor(s) 318 can include a motion sensor, an accelerometer (e.g., laser, magnetic, piezoelectric, etc.), gyroscope, and/or any other suitable device for measuring the movement of the steering mechanism 202 (e.g., to identify the rate of change associated with steering mechanism 202). The sensor(s) 318 can be in wired and/or wireless communication with the rate control system 306. The sensor(s) 318 can acquire the data 316 associated with the steering mechanism 202 (e.g., indicative of an angular velocity) and provide the data 316 to the rate control system 306. In this way, the rate control system 306 can obtain data 316 that is indicative of, for example, a current rate of change (e.g., angular rate) at which the steering mechanism 202 is moving. This can help the rate control system 306 implement a reactive approach to controlling the steering mechanism 202.

In some implementations, the data 316 associated with the steering mechanism 202 can be obtained via the mobility controller 135 and/or the position controller 302. This can help the rate control system 306 implement a proactive approach to controlling the steering mechanism 202. For example, the data 316 can be indicative of a position to which the steering mechanism 202 is to be adjusted (e.g., an angle to which it is to be rotated), a rate of speed (e.g., angular velocity rate) at which the steering mechanism 202 is to be adjusted, the timing at which the steering mechanism 202 is to be adjusted (e.g., within X timeframe, at a point in time, etc.), and/or other information that the mobility controller 135 may provide (e.g., to the position controller 302). Additionally, or alternatively, the data 316 can be indicative of the amount of force (e.g., torque force) to be applied to the steering mechanism 202 (e.g., the torque force request provided from the position controller 302 to the motor controller 304). In some implementations, the rate control system 306 can obtain similar such data from the motor controller 304. In some implementations, the rate control system 306 can obtain data indicative of the force requested by other systems (e.g., the power assist system 312).

The rate control system 306 can determine an occurrence of a fault 318 associated with the vehicle 104 based at least in part on the data 316 associated with the steering mechanism 202. The fault 318 can be associated with a rate of change 320 of the steering mechanism 202. For example, the rate control system 306 can identify a rate of change 320 in a position associated with the steering mechanism 202 of the vehicle 104 based at least in part on the data 316 associated with the steering mechanism 202. In some implementations, the rate of change 320 can be an angular rate of change indicating the rate of change in the angle of the steering mechanism 202. In some implementations, the rate of change 320 can be a rate of change in types of positions other than a change in the angular position of the steering mechanism 202. For example the rate of change can be indicative of a rate of change in a lateral position, vertical position, and/or any other position of the steering mechanism 202 (e.g., in a two-dimensional and/or a three-dimensional space).

The rate control system 306 can proactively and/or reactively determine the rate of change 320 associated with the steering mechanism 202. In some implementations, the steering control system 306 can determine a projected rate of change at which the steering mechanism 202 would move in the event that an amount of force is applied to the steering mechanism 202 (e.g., the force requested by the position controller 302). For example, the rate control system 306 can calculate a projected rate of change at which the steering mechanism 202 would move in the event that the steering mechanism 202 was adjusted to the desired position with the requested force (e.g., based at least in part on data from the mobility controller 135 and/or the position controller 302). In some implementations, the rate control system 306 can determine a current rate of change in the position of the steering mechanism 202 (e.g., based at least in part on data from the sensor(s) 318 associated with the steering mechanism 202). For example, the rate control system 306 can calculate a current rate of change in the position of the steering mechanism 202 based at least in part on data 316 from the sensor(s) 318 (e.g., that are monitoring motion of the steering mechanism 202) and/or from the motor controller 304 (e.g., that is causing a motor to adjust the steering mechanism 202 at a particular angular rate).

To help determine the occurrence of a fault 318 (e.g., associated with the rate of change 320), the rate control system 306 can compare the rate of change 320 associated with the steering mechanism 202 to a rate limit 322 to determine whether a fault 318 has occurred. The rate limit 322 can be based at least in part on a rate limit curve defined using measurements of human operator reaction times and analysis of vehicle movement in a fault condition. For instance, the rate limit 322 can represent a rate at which it would be difficult for the user 110 (e.g., human operator) to react in time to assume the necessary control of the steering mechanism 202. In some implementations, the rate limit 322 can be based at least in part on a current and/or planned vehicle speed and/or other factors. The rate limit 322 can be stored onboard the vehicle 104 in a memory accessible by the rate control system 306. The rate limit 322 can be adjustable (e.g., via the operations computing system 106) and/or onboard the vehicle 104. The rate limit 322 can be specific to a particular operator, a type of vehicle, type of steering mechanism, etc. In some implementations, the rate limit 322 can be adjusted in real-time and/or near real-time.

The rate control system 306 can determine that the identified rate of change 320 (e.g., angular rate of change) associated with the steering mechanism 202 exceeds a rate limit 322 (e.g., an angular rate limit) associated with the steering mechanism 202 (e.g., steering wheel). If so, the rate control system 306 can determine that a fault 318 associated with the vehicle 104 (e.g., the steering control system 300, the position controller 302, etc.) has occurred.

Figure 4:
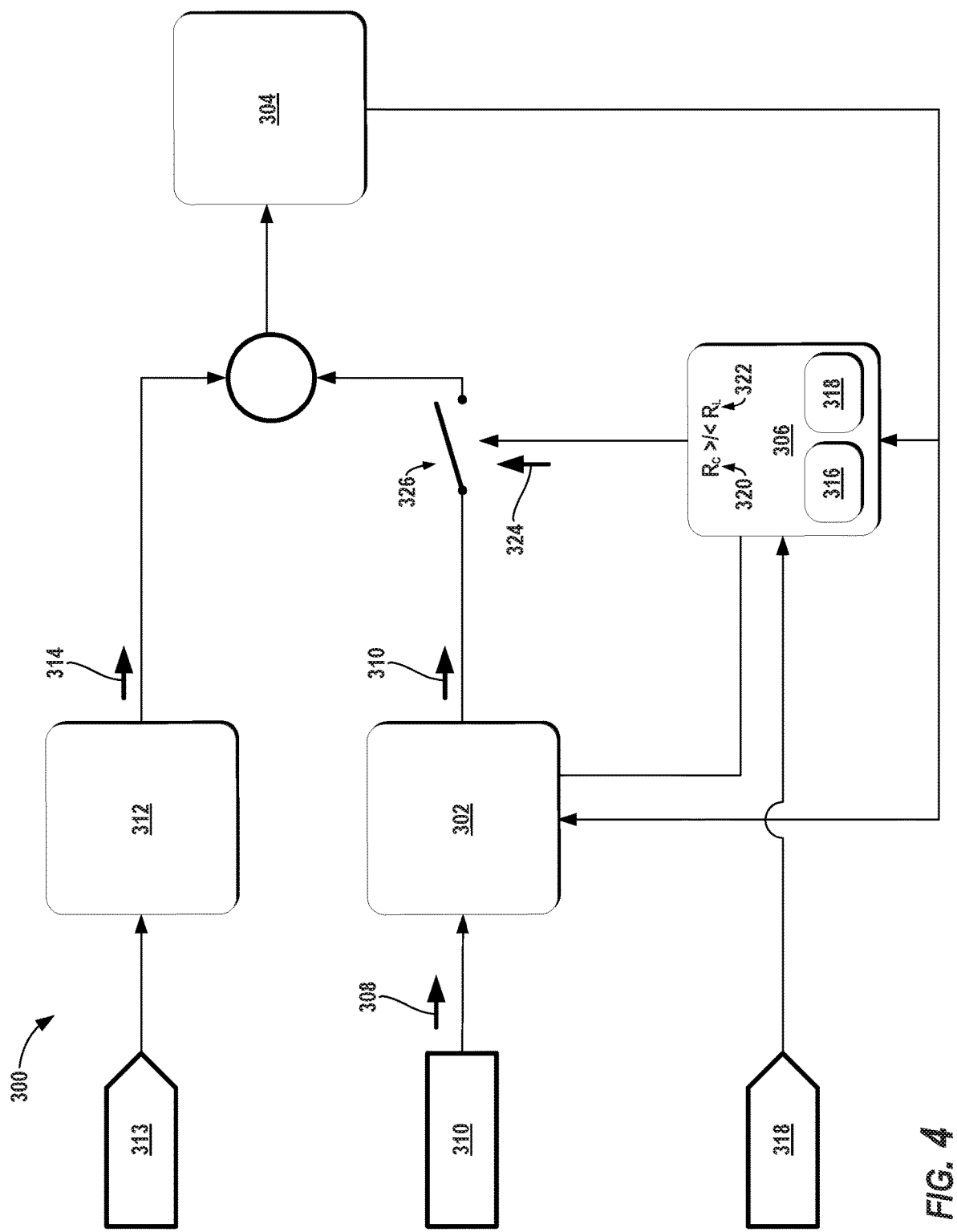
FIG. 4 depicts an example steering control system for controlling a steering mechanism of an autonomous vehicle with an open switching element according to example embodiments of the present disclosure.

In response to determining the occurrence of the fault 318, the steering control system 300 can adjust the steering mechanism 202 of the vehicle 104. For instance, the rate control system 306 can adjust the amount of the force (e.g., torque force) to be applied to the steering mechanism 202 based at least in part on the rate of change 320 exceeding the rate limit 322. To do so, the steering control system 300 can prevent the position controller 302 of the vehicle 104 from providing a control signal (e.g., 310) to a motor controller 304. For example, the rate control system 306 can provide one or more control signals 324 to change the state of a switching element 326 (e.g., to cause the switching element 326 to open). For example, the switching element 326 can include a switch, a transistor, and/or any other suitable device that can interrupt and/or prevent (at least temporarily) communication between the position controller 302 and the motor controller 304. For example, the switching element 326 can interrupt the flow of electrons in a circuit. The control signal(s) 324 can change the switching element 326 from a first state (e.g., closed state as shown in FIG. 3) to a second state (e.g., an open state as shown in FIG. 4). The rate control system 306 can cause the switching element 326 to open to prevent/stop control signals (e.g., 310) from reaching the motor controller 304. In this way, the rate control system 306 can adjust (e.g., prevent, decrease, etc.) an amount of a force to be applied to the steering mechanism 202 (e.g., by the motor controller), in response to determining that the rate of change 320 exceeds the rate limit 322. This can lead to a decrease in the rate of change 320 associated with the steering mechanism 202, to allow a user 110 to take control of the steering mechanism 202.

In some implementations, the vehicle computing system 102 can adjust the operating mode of the vehicle 104 based at least in part on the occurrence of the fault 318. For example, as described herein the vehicle 104 can be configured to operate in a plurality of operating modes that include a first operating mode (e.g., a fully autonomous mode 106A) and a second operating mode (e.g., a manual operating mode 106C). The vehicle 104 can be operating in the first operating mode (e.g., the fully autonomous operating mode 106A), with a user 110 (e.g., human operator) present in the vehicle 104. The vehicle computing system 102 can detect that a fault 318 has occurred, that the rate of change 320 exceeds the rate limit 322, the switching element 326 has opened, detect a change in the steering mechanism 202 (e.g., the steering rack), etc. when the rate control system 306 determines that the rate of change 320 associated with the steering mechanism 202 exceeds the rate limit 322. The vehicle computing system 102 can adjust the vehicle 104 from the first operating mode to the second operating mode (e.g., manual operating mode 106C) that allows the user 110 (e.g., human operator) to control the motion of the vehicle 102 (e.g., based at least in part on the rate of change 320 exceeding the rate limit 322). In some implementations, the vehicle computing system 102 can activate the indicator 208 to alert the user 110 (e.g., visually, audibly, via haptic feedback) to provide user input to the steering mechanism 202 (e.g., to manually operate the steering wheel).

The vehicle 102 can include a fallback safety procedure in the event that the user 110 does not provide user input to the steering mechanism (e.g., manually grab a steering wheel). For example, the vehicle computing system 104 can be configured to monitor the steering mechanism 202 to determine if a user 110 has provided user input to the steering mechanism 202. If not, the vehicle computing system 102 can send one or more control signals to the vehicle control system(s) 116 to decelerate the vehicle 104 to a stopped position. In this way, the vehicle 104 can perform a safe operating maneuver in the event that the user 110 is unable to assume manual control of the vehicle 104.

The operating mode of the vehicle 104 can be reset to a fully autonomous operating mode 106A. For example, the user 110 can determine that the fault 318 has been addressed and that the vehicle 104 is in condition to return to autonomous navigation. The user 110 can adjust a physical interface and/or a plurality of interfaces (e.g., in a particular sequence) to adjust the operating mode of the vehicle 104 from the manual operating mode 106C to the fully (or semi) autonomous operating modes 106A-B. Additionally, or alternatively, such an action can cause the switching element to adjust from the open state (e.g., as shown in FIG. 4) to the closed state (e.g., as shown in FIG. 3). This can allow the position controller 302 to provide control signals (e.g., with force requests) to the motor controller 304.

In some implementations, the vehicle 104 can reset the operating mode without user input and onboard the vehicle 102. For example, the vehicle computing system 102 can perform an onboard diagnostic to determine the cause and solution to address the fault 318. In the event that the vehicle 104 can address the fault 318 (e.g., by re-cycling its power) without maintenance it may do so. In the event that the vehicle 104 may require maintenance to address the fault 318, the vehicle computing system 102 can help route the vehicle 104 to travel to a location (e.g., service depot) to receive maintenance to address the fault 318. Once the fault 318 is cleared, the vehicle computing system 102 can cause the operating mode of the vehicle 104 to change (e.g., back to the fully autonomous operating mode 106A) and/or cause the switching element 326 to close (e.g., permitting communication between the position controller 302 and the motor controller 304).

In some implementations, the operating mode of the vehicle 104 can be reset by one or more remote computing systems. For example, the operations computing system 106 can determine that the vehicle 104 is in safe condition and/or that the fault 318 has cleared. The operations computing system 106 can provide one or more control signals to the vehicle 104 to cause the vehicle 104 to change the operating mode (e.g., from the manual control operating mode 106C to the fully autonomous operating mode 106A). Additionally, or alternatively, the operations computing system 106 can send control signals to cause the switching element 326 to close (e.g., permitting communication between the position controller 302 and the motor controller 304).

Figure 5:
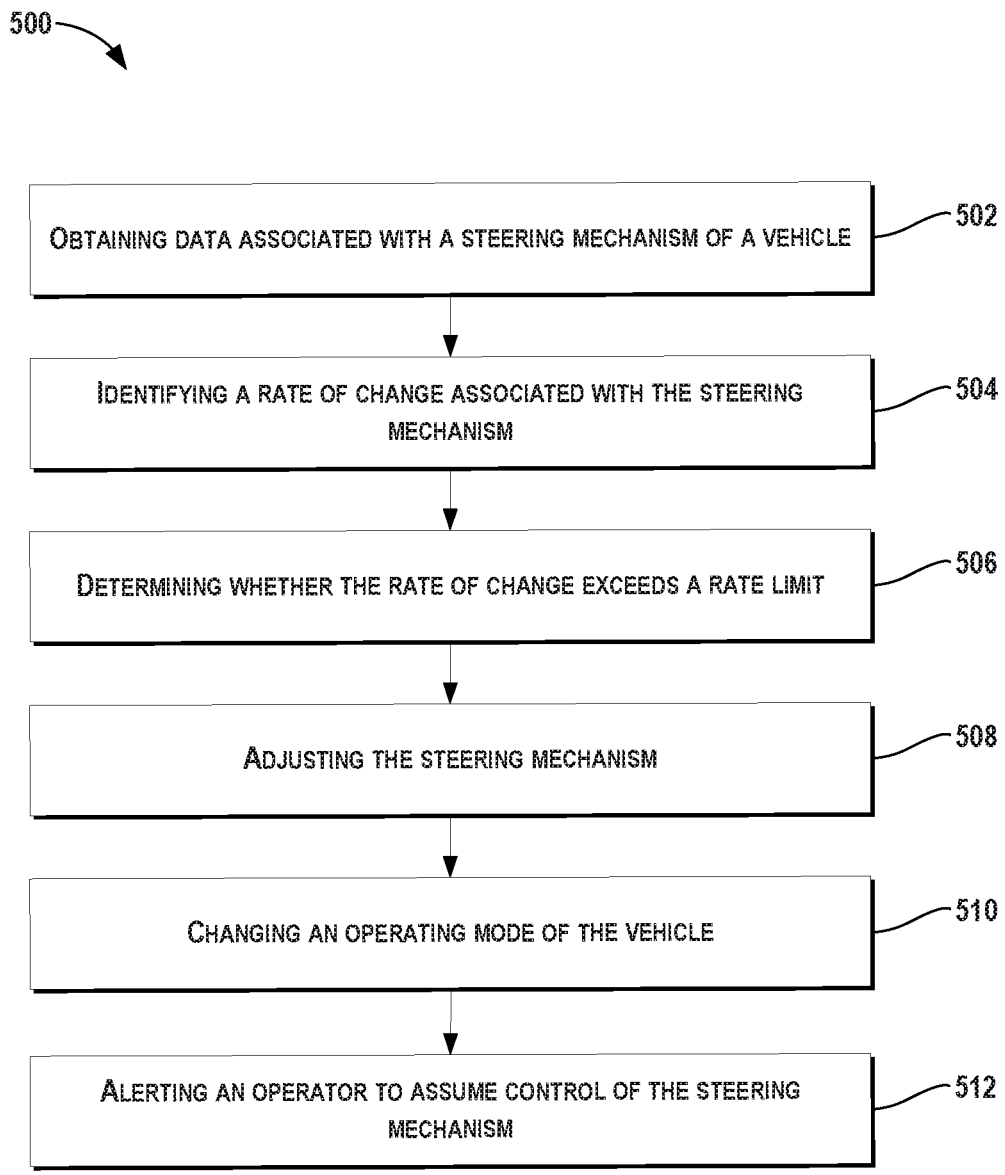
FIG. 5 depicts a flow diagram of an example method of controlling an autonomous vehicle steering mechanism according to example embodiments of the present disclosure.

FIG. 5 depicts a flow diagram of an example method 500 of controlling an autonomous vehicle steering mechanism according to example embodiments of the present disclosure. One or more portion(s) of the method 500 can be implemented by one or more computing devices such as, for example, the one or more computing device(s) of the vehicle computing system 102. Each respective portion of the method 500 (e.g., 502-512) can be performed by any (or any combination) of the one or more computing devices. Moreover, one or more portion(s) of the method 500 can be implemented as an algorithm on the hardware components of the device(s) described herein (e.g., as in FIGS. 1 and 6), for example, to control an autonomous vehicle steering mechanism. Similar systems, methods, and techniques, as described herein, can also, or alternatively, be used to control other vehicle input device(s), such as those described herein. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At (502), the method 500 can include obtaining data associated with a steering mechanism of a vehicle. For instance, the vehicle computing system 102 (e.g., the steering control system 300) can obtain data 316 associated with a steering mechanism 202 of a vehicle 104. As described herein, the steering mechanism 202 can control at least a heading of the vehicle 104. In some implementations, the data 316 associated with the steering mechanism 202 can be obtained via a sensor 318 associated with the steering mechanism 202. The data 316 associated with the steering mechanism 202 is indicative of a current rate of change at which the steering mechanism 202 is moving, as described herein.

In some implementations, the data 316 can be indicative of at least a portion of the amount of force (e.g., torque force) to be applied to the steering mechanism 202. For example, the vehicle 104 can include a mobility controller 135 that receives data indicative of a motion plan 134 associated with the vehicle 104 and provides one or more control signals 308 indicative of at least a position (e.g., an angle) to which the steering mechanism 202 is to be adjusted (e.g., rotated) in accordance with the motion plan. The position controller 302 can receive the one or more control signals 308 and can determine an amount of force to be applied to the steering mechanism 202 to adjust the steering mechanism 202 according to the motion plan 134 (e.g., via a motor controller 304).

At (504), the method 500 can include identifying a rate of change associated with the steering mechanism. For instance, the vehicle computing system 102 (e.g., the steering control system 300) can identify a rate of change 320 associated with the steering mechanism 202 of the vehicle 104 based at least in part on the data 316 associated with the steering mechanism 202. In some implementations, the rate of change 320 can be an angular rate of change associated with an angle (e.g., of a steering wheel). In some implementations, the vehicle computing system 102 (e.g., the steering control system 300) can determine a projected rate of change at which the steering mechanism 202 would move in an event that the amount of the force is applied to the steering mechanism 202.

At (506), the method 500 can include determining whether the rate of change exceeds a rate limit. The vehicle computing system 102 (e.g., the steering control system 300) can determine that the rate of change exceeds a rate limit 322 associated with the steering mechanism 202. This can allow the vehicle computing system 102 to determine the occurrence of a fault 318 (e.g., associated with the position controller 302). In some implementations, data indicative of the fault can be logged and/or recorded, and provided to a remote computing device (and/or onboard memory). This can help with vehicle fault diagnosis, maintenance coordination, etc.

At (508), the method 500 can include adjusting the steering mechanism. For instance, in response to determining that the rate of change 320 exceeds the rate limit 322, the vehicle computing system 102 (e.g., the steering control system 300) can adjust the steering mechanism 202 of the vehicle 104. By way of example, the vehicle computing system 102 can decrease the amount of force (e.g., torque force) to be applied to the steering mechanism 202 (e.g., by a motor associated with a steering rack). To do so, the vehicle computing system 102 (e.g., the steering control system 300) can provide one or more control signals 324 to prevent communication from a position controller 302 associated with the steering mechanism 202 to a motor controller 304 associated with the steering mechanism 202. This can prevent the motor controller 304 from receiving a control signal indicative of a force (e.g., torque force) requested by the position controller 302. As such, the motor controller 304 is prevented and/or stopped from applying the amount of force (e.g., erroneously determined by the position controller 302), which would cause the position of the steering mechanism 202 to move at a rate of change 320 that exceeds the rate limit 322. In this way, a user 110 (e.g., a human operator) can effectively assume control of the vehicle 104.

At (510), the method 500 can include changing an operation of the vehicle. For instance, the vehicle 104 can operate in a fully autonomous operating mode 106A when the fault 318 occurs and the steering mechanism 202 is adjusted. The vehicle computing system 102 can detect such a change (e.g., via monitoring of and/or communication with the steering rack). The vehicle computing system 102 (e.g., the steering control system 300) can adjust the vehicle 102 to operate in a manual operating mode 106C when the rate of change 320 exceeds the rate limit 322. In some implementations, the method 500 can include alerting an operator to assume control of the steering mechanism 202, at (512). For instance, the vehicle computing system 102 (e.g., the steering control system 300) can activate the indicator 208 to alert a user 110 located within the vehicle 104 to provide input to the steering mechanism 202 of the vehicle 104.

Figure 6:
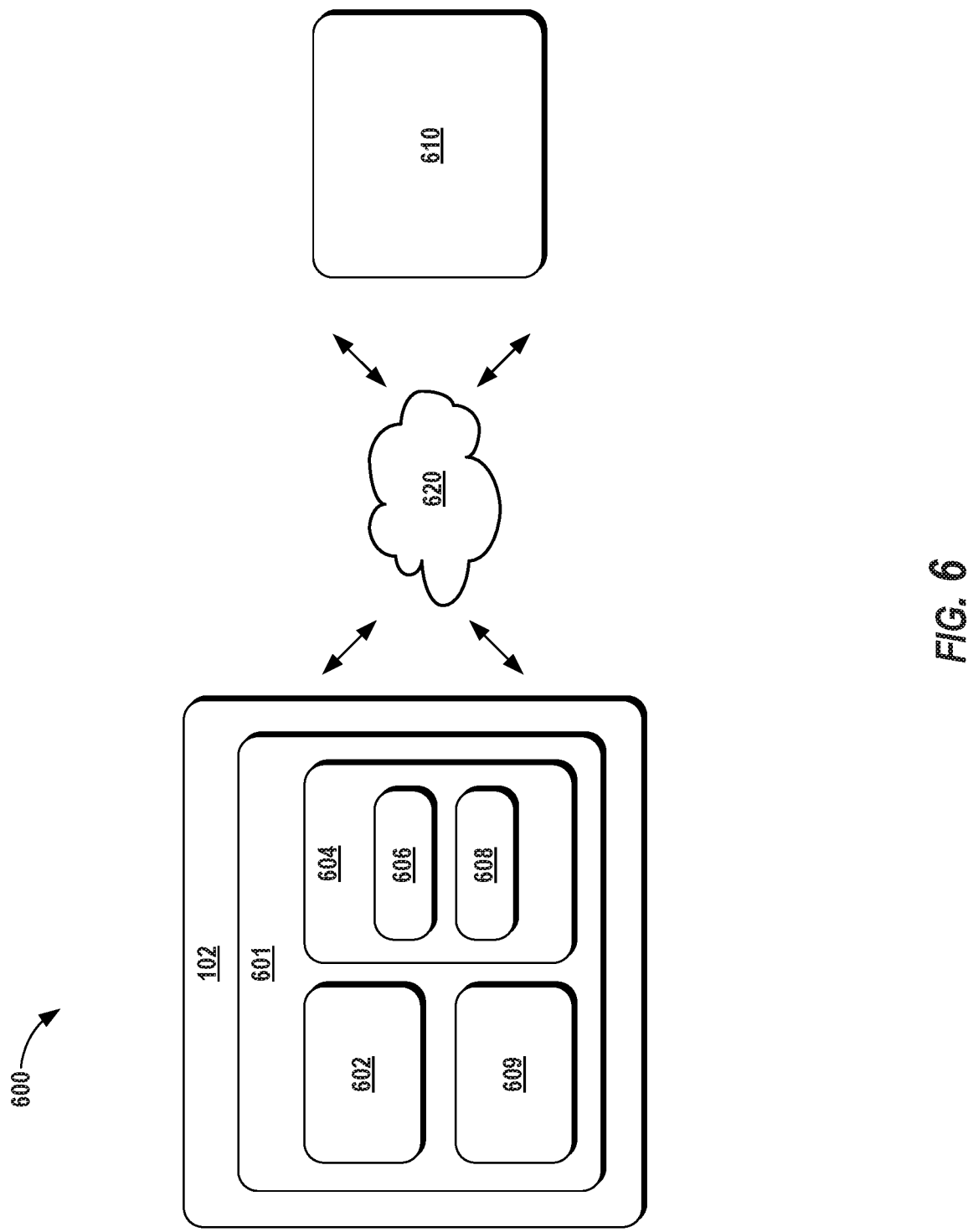
FIG. 6 depicts example system components according to example embodiments of the present disclosure.

FIG. 6 depicts an example computing system 600 according to example embodiments of the present disclosure. The example system 600 illustrated in FIG. 6 is provided as an example only. The components, systems, connections, and/or other aspects illustrated in FIG. 6 are optional and are provided as examples of what is possible, but not required, to implement the present disclosure. The example system 600 can include the vehicle computing system 102 of the vehicle 104 and, in some implementations, a remote computing system 610 including one or more remote computing device(s) that are remote from the vehicle 104 (e.g., the operations computing system 106) that can be communicatively coupled to one another over one or more networks 620. The remote computing system 610 can be associated with a central operations system and/or an entity associated with the vehicle 104 such as, for example, a vehicle owner, vehicle manager, fleet operator, service provider, etc.

The computing device(s) 601 of the vehicle computing system 102 can include processor(s) 602 and a memory 604. The one or more processors 602 can be any suitable processing device (e.g., a processor core, a microprocessor, an ASIC, a FPGA, a controller, a microcontroller, etc.) and can be one processor or a plurality of processors that are operatively connected. The memory 604 can include one or more non-transitory computer-readable storage media, such as RAM, ROM, EEPROM, EPROM, one or more memory devices, flash memory devices, etc., and combinations thereof.

The memory 604 can store information that can be accessed by the one or more processors 602. For instance, the memory 604 (e.g., one or more non-transitory computer-readable storage mediums, memory devices) on-board the vehicle 104 can include computer-readable instructions 606 that can be executed by the one or more processors 602. The instructions 606 can be software written in any suitable programming language or can be implemented in hardware. Additionally, or alternatively, the instructions 606 can be executed in logically and/or virtually separate threads on processor(s) 602.

For example, the memory 604 on-board the vehicle 104 can store instructions 606 that when executed by the one or more processors 602 on-board the vehicle 104 cause the one or more processors 602 (the vehicle computing system 102) to perform operations such as any of the operations and functions of the vehicle computing system 102, as described herein, the operations for controlling an autonomous vehicle steering mechanism (e.g., one or more portions of method 500), and/or any other functions for controlling an autonomous vehicle steering mechanism, as described herein.

The memory 604 can store data 608 that can be obtained, received, accessed, written, manipulated, created, and/or stored. The data 608 can include, for instance, data associated with an a steering mechanism, data associated with a rate of change, data associated with a rate limit, data associated with a fault, data associated with vehicle operating modes, and/or other data/information as described herein. In some implementations, the computing device(s) 601 can obtain data from one or more memory device(s) that are remote from the vehicle 104.

The computing device(s) 601 can also include a communication interface 609 used to communicate with one or more other system(s) on-board the vehicle 104 and/or a remote computing device that is remote from the vehicle 104 (e.g., of remote computing system 610). The communication interface 609 can include any circuits, components, software, etc. for communicating via one or more networks (e.g., 620). In some implementations, the communication interface 609 can include, for example, one or more of a communications controller, receiver, transceiver, transmitter, port, conductors, software and/or hardware for communicating data.

The network(s) 620 can be any type of network or combination of networks that allows for communication between devices. In some embodiments, the network(s) can include one or more of a local area network, wide area network, the Internet, secure network, cellular network, mesh network, peer-to-peer communication link and/or some combination thereof and can include any number of wired or wireless links. Communication over the network(s) 620 can be accomplished, for instance, via a communication interface using any type of protocol, protection scheme, encoding, format, packaging, etc.

The remote computing system 610 can include one or more remote computing devices that are remote from the vehicle computing system 102. The remote computing devices can include components (e.g., processor(s), memory, instructions, data) similar to that described herein for the computing device(s) 601. Moreover, the remote computing system 610 can be configured to perform one or more operations of the operations computing system 106, as described herein.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for controlling an autonomous vehicle steering mechanism, comprising:
obtaining, by a computing system comprising one or more computing devices, data associated with a steering mechanism of an autonomous vehicle;
identifying, by the computing system, a rate of change associated with the steering mechanism of the autonomous vehicle based at least in part on the data associated with the steeling mechanism, wherein the rate of change is associated with a force for adjusting the steering mechanism in accordance with a motion plan of the autonomous vehicle;
determining, by the computing system, that the rate of change associated with the force for adjusting the steering mechanism in accordance with the motion plan of the autonomous vehicle exceeds a rate limit associated with the steering mechanism of the autonomous vehicle; and in response to determining that the rate of change exceeds the rate limit, adjusting, by the computing system, the steering mechanism of the autonomous vehicle.

2. The computer-implemented method of claim 1, wherein adjusting, by the computing system, the steering mechanism of the autonomous vehicle based at least in part on the rate of change exceeding the rate limit comprises:
   decreasing, by the computing system, an amount of the force to be applied to the steering mechanism.

3. The computer-implemented method of claim 2, wherein identifying the rate of change associated with the position of the steering mechanism of the autonomous vehicle based at least in part on the data associated with the steering mechanism comprises:
   determining, by the computing system, a projected rate of change at which the steering mechanism would move in an event that the amount of the force is applied to the steering mechanism.

4. The computer-implemented method of claim 2, wherein decreasing, by the computing system, the amount of the force to be applied to the steering mechanism comprises:
   providing, by the computing system, one or more control signals to prevent communication from a position controller associated with the steering mechanism to a motor controller associated with the steering mechanism.

5. The computer-implemented method of claim 2, wherein the rate of change is an angular rate of change, and wherein the force is a torque force.

6. The computer-implemented method of claim 1, the data associated with the steering mechanism is obtained via a sensor associated with the steering mechanism.

7. The computer-implemented method of claim 1, wherein the data associated with the steering mechanism is indicative of a current rate of change at which the steering mechanism is moving.

8. The computer-implemented method of claim 1, wherein the autonomous vehicle is configured to operate in an autonomous operating mode, and to the operations further comprise:
   adjusting, by the computing system, the autonomous vehicle to operate in a manual operating mode when the rate of change exceeds the rate limit.

9. A computing system for controlling an autonomous vehicle steering mechanism, comprising:
   one or more processors; and
   one or more memory devices, the one or more memory devices storing instructions that when executed by the one or more processors cause the control system to perform operations, the operations comprising:
      obtaining data associated with a steering mechanism of an autonomous vehicle;
      identifying a rate of change associated with the steering mechanism of the autonomous vehicle based at least in part on the data associated with the steering mechanism, wherein the rate of change is associated with a force for adjusting the steering mechanism in accordance with a motion plan of the autonomous vehicle;
      determining that the rate of change associated with the force for adjusting the steering mechanism in accordance with the motion plan of the autonomous vehicle exceeds a rate limit associated with the steering mechanism of the autonomous vehicle; and
      in response to determining that the rate of change exceeds the rate limit, adjusting an amount of the force to be applied to the steering mechanism.

10. The computing system of claim 9, wherein the data associated with the steering mechanism is indicative of at least one of a position to which the steeling mechanism is to be adjusted, the rate of change associated with the steering mechanism, or at least a portion of the amount of the force to be applied to the steering mechanism.

11. The computing system of claim 10, wherein the steering mechanism comprises a steering wheel and the rate of change is an angular rate of change associated with an angle of the steering wheel.

12. The computing system of claim 9, wherein adjusting the amount of the force to be applied to the steering mechanism comprises:
   preventing a position controller of the autonomous vehicle from providing a control signal to a motor controller associated with a motor of the steering mechanism.

13. The computing system of claim 12, wherein the control signal is indicative of at least a portion of the amount of the force to be applied to the steering mechanism.

14. The computing system of claim 12, wherein preventing a position controller of the autonomous vehicle from providing a signal to a motor control system associated with a motor of the steering mechanism comprises:
   causing a switching element between the position controller and the motor control system to open.

15. The computing system of claim 9, wherein the autonomous vehicle is configured to operate in a first operating mode, and wherein the operations further comprise:
   adjusting the autonomous vehicle to operate in a second operating mode based at least in part on the rate of change exceeding a rate limit.

* * * * *